(12) United States Patent
Katoh

(10) Patent No.: US 8,209,105 B2
(45) Date of Patent: Jun. 26, 2012

(54) INTERNAL COMBUSTION ENGINE CONTROL APPARATUS AND METHOD

(75) Inventor: Kenji Katoh, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 485 days.

(21) Appl. No.: 12/517,369

(22) PCT Filed: Dec. 21, 2007

(86) PCT No.: PCT/IB2007/004041
§ 371 (c)(1),
(2), (4) Date: Jun. 3, 2009

(87) PCT Pub. No.: WO2008/081279
PCT Pub. Date: Jul. 10, 2008

(65) Prior Publication Data
US 2010/0004847 A1    Jan. 7, 2010

(30) Foreign Application Priority Data

Dec. 21, 2006  (JP) .................................. 2006-343858

(51) Int. Cl.
*F02D 41/14* (2006.01)
*F02B 13/00* (2006.01)
(52) U.S. Cl. ........................ 701/103; 123/575; 123/443
(58) Field of Classification Search .......... 701/101–115; 123/575, 299, 300, 304, 373, 374, 692, 698, 123/703, 704, 443; 60/276, 285, 286, 287, 60/299, 300
See application file for complete search history.

(56) References Cited

U.S. PATENT DOCUMENTS

| 676,641 | A | * | 6/1901 | Venn ................................. 74/466 |
| 4,913,099 | A | * | 4/1990 | Ota ................................. 123/478 |
| 5,327,866 | A | | 7/1994 | Kitajima |
| 6,397,583 | B1 | * | 6/2002 | Davey et al. .................... 60/277 |
| 6,568,177 | B1 | * | 5/2003 | Surnilla .......................... 60/285 |
| 6,868,667 | B2 | * | 3/2005 | Surnilla .......................... 60/285 |
| 6,928,998 | B2 | * | 8/2005 | Abe ................................ 123/674 |
| 6,955,155 | B2 | * | 10/2005 | Surnilla ................... 123/339.11 |
| 7,032,572 | B2 | * | 4/2006 | Bidner et al. ............ 123/406.47 |

(Continued)

FOREIGN PATENT DOCUMENTS

DE    43 10 145    4/1994

(Continued)

*Primary Examiner* — Stephen K Cronin
*Assistant Examiner* — Raza Najmuddin
(74) *Attorney, Agent, or Firm* — Oblon, Spivak, McClelland, Maier & Neustadt, L.L.P.

(57) ABSTRACT

An internal combustion engine control apparatus controls an internal combustion engine including: an exhaust passage including branch portions provided for the left and right banks and a common portion in which an exhaust gas purification device is provided; and a fuel supply system that supplies fuel to the respective engine cylinders. In the internal combustion engine, in order to recover the exhaust gas purification device, a bank control is executed in which the air-fuel ratio of the cylinders of the left bank is made rich while the air-fuel ratio of the cylinders of the right bank is made lean. The internal combustion engine is capable of running on alcohol-containing fuel and has an alcohol concentration sensor. The amount of unburned fuel to be supplied to the exhaust gas purification device during the bank control is adjusted based on the alcohol concentration in fuel.

13 Claims, 5 Drawing Sheets

U.S. PATENT DOCUMENTS

| | | | |
|---|---|---|---|
| 7,111,450 B2 * | 9/2006 | Surnilla | 60/285 |
| 7,461,628 B2 * | 12/2008 | Blumberg et al. | 123/304 |
| 7,997,063 B2 * | 8/2011 | Thanasiu et al. | 60/276 |
| 2003/0221416 A1 | 12/2003 | Ingram et al. | |
| 2009/0024304 A1 * | 1/2009 | Takubo | 701/103 |
| 2009/0210134 A1 * | 8/2009 | Miyata et al. | 701/103 |
| 2009/0282810 A1 * | 11/2009 | Leone et al. | 60/285 |
| 2009/0314267 A1 * | 12/2009 | Kawai et al. | 123/674 |

FOREIGN PATENT DOCUMENTS

| | | | |
|---|---|---|---|
| EP | 001515014 A1 * | | 3/2005 |
| JP | 5 106498 | | 4/1993 |
| JP | 8 189388 | | 7/1996 |
| JP | 08-189388 | * | 7/1996 |
| JP | 2003 254052 | | 9/2003 |
| JP | 2004 44421 | | 2/2004 |
| JP | 2005 188341 | | 7/2005 |

* cited by examiner

INTERNAL COMBUSTION ENGINE CONTROL APPARATUS AND METHOD

FIELD OF THE INVENTION

The invention relates to a control apparatus and a control method for an internal combustion engine capable of running on alcohol-containing fuel and having a recoverable exhaust gas purification device.

BACKGROUND OF THE INVENTION

Japanese Patent Application Publication No. 2003-254052 (JP-A-2003-254052) recites an exhaust purification system of an internal combustion engine. According to this system, the amount of poisoning substances adhering to an exhaust gas purification catalyst is estimated through calculations, and if the estimated adhering amount is larger than a reference amount, a poisoning curing process is executed in which the temperature of exhaust gas is forcibly increased by carrying out at least one of: reducing the air-fuel ratio (providing fuel-rich air-fuel mixtures); retarding the ignition timing; and suspending exhaust gas recirculation. Further, Japanese Patent Application Publication No. 08-189388 (JP-A-08-189388) recites an exhaust gas purification system that changes the temperature of an exhaust gas purification catalyst by making the air-fuel ratio of one or more of engine cylinders higher than the stoichiometric air-fuel ratio while making the air-fuel ratio of the rest of the engine cylinders lower than the stoichiometric air-fuel ratio. Further, Japanese Patent Application Publication No. 05-106498 (JP-A-05-106498) recites a control system that controls an internal combustion engine capable of running on alcohol-containing fuel. This control system detects the heaviness of fuel based on the alcohol concentration in the same fuel and controls the internal combustion engine based on the fuel heaviness and the alcohol concentration in the fuel.

The calorific value of alcohol (e.g., ethanol) per unit amount (will be simply referred to as "calorific value") is smaller than that of hydrocarbon fuel (e.g., gasoline). Therefore, the calorific value of alcohol-containing fuel decreases as the alcohol concentration increases. Thus, in an internal combustion engine capable of running on alcohol-containing fuel, when a process for recovering an exhaust gas purification device (e.g., exhaust gas purification catalyst) is performed in which the exhaust gas purification device is heated by supplying unburned fuel to it by making the air-fuel ratio of one or more of the cylinders of the internal combustion engine lower (richer) than the stoichiometric air-fuel ratio, if the alcohol concentration of fuel is too high, the exhaust gas purification device may fail to be heated sufficiently. None of the technologies described in JP-A-2003-254052, JP-A-08-189388, and JP-A-05-106498 addresses the issue of the alcohol concentration in fuel at the time of performing the process for recovering the exhaust gas purification device, and, during the recovery process, the exhaust gas purification device may fail to be heated to a target temperature and thus the recovery process may fail to recover the exhaust gas purification device properly.

DISCLOSURE OF THE INVENTION

The invention provides a control apparatus and a control method for an internal combustion engine capable of running on alcohol-containing fuel, which enables an exhaust gas purification device (e.g., exhaust gas purification catalyst) to be properly recovered regardless of the variation of the alcohol concentration in fuel.

The first aspect of the invention relates to an internal combustion engine control apparatus. This internal combustion engine control apparatus includes: a plurality of cylinder groups each consisting of at least one cylinder; an exhaust passage having branch portions provided for the respective cylinder groups and a common portion extending toward the downstream side from where the branch portions converge; a recoverable exhaust gas purification device provided in the common portion; a fuel supply system that supplies fuel to the respective cylinder groups; a controller that executes, through the control of the fuel supply system, a bank control in which the air-fuel ratio of a first cylinder group among the cylinder groups is made richer (lower) than a stoichiometric air-fuel ratio and the air-fuel ratio of a second cylinder group among the cylinder groups is made leaner (higher) than the stoichiometric air-fuel ratio so as to recover the exhaust gas purification device. The internal combustion engine is capable of running on fuel containing alcohol and includes an alcohol concentration obtaining portion that obtains the concentration of alcohol in fuel supplied from the fuel supply system. The controller adjusts, through the control of the fuel supply system, the amount of unburned fuel to be supplied to the exhaust gas purification device during the bank control based on the alcohol concentration obtained by the alcohol concentration obtaining portion.

According to the internal combustion engine control apparatus described above, because the amount of unburned fuel to be supplied to the exhaust gas purification device during the bank control can be properly adjusted, the exhaust gas purification device can be heated up to the target temperature when recovering the exhaust gas purification device. Thus, the exhaust gas purification device can be properly recovered regardless of the variation of alcohol concentration in fuel.

The internal combustion engine control apparatus according to the first aspect of the invention may be such that the higher the alcohol concentration obtained by the alcohol concentration obtaining portion, the larger the controller makes, through the control of the fuel supply system, the amount of unburned fuel to be supplied to the exhaust gas purification device during the bank control. Because the calorific value of fuel decreases as the alcohol concentration in the fuel increases as mentioned above, by adjusting the amount of unburned fuel to be supplied to the exhaust gas purification device, the exhaust gas purification device can be heated up to the target temperature for recovering it.

Further, the internal combustion engine control apparatus according to the first aspect of the invention may be such that the controller corrects the amount of fuel to be supplied to the first cylinder group during the bank control based on the alcohol concentration obtained by the alcohol concentration obtaining portion. By correcting the amount of fuel to be supplied to the first cylinder group, the air-fuel ratio of which is made richer than the stoichiometric air-fuel ratio during the bank control, the amount of unburned fuel to be supplied to the exhaust gas purification device can be adjusted as needed.

Further, the internal combustion engine control apparatus according to the first aspect of the invention may be such that the higher the alcohol concentration obtained by the alcohol concentration obtaining portion, the larger the controller makes, through the control of the fuel supply system, the amount of fuel to be supplied to the first cylinder group during the bank control. The higher the alcohol concentration in fuel, the larger the amount of fuel needed to heat the exhaust gas purification device. Therefore, by controlling the fuel supply amount as described above, the exhaust gas purification device can be properly heated up to the target temperature for recovering the exhaust gas purification device.

Further, the internal combustion engine control apparatus according to the first aspect of the invention may be such that the controller changes the duration of the bank control based on the alcohol concentration obtained by the alcohol concentration obtaining portion. The longer the duration of the bank control, the larger the amount of unburned fuel supplied to the exhaust gas purification device. Therefore, by changing the duration of the bank control in accordance with the alcohol concentration in fuel, the exhaust gas purification device can be properly heated up to the target temperature for recovering the exhaust gas purification device.

Further, the internal combustion engine control apparatus according to the first aspect of the invention may be such that the higher the alcohol concentration obtained by the alcohol concentration obtaining portion, the longer the controller makes the duration of the bank control. As mentioned above, the higher the alcohol concentration in fuel, the smaller the calorific value of the fuel becomes, so that the exhaust gas purification device fails to be heated to the target temperature and thus the desorption speed of poisoning substances (sulfurs) decreases accordingly. As such, by changing the duration of the bank control as described above, the exhaust gas purification device can be properly recovered.

Further, the internal combustion engine control apparatus according to the first aspect of the invention may be such that the exhaust gas purification device is adapted to exert its purification capability properly within a given air-fuel ratio range including the stoichiometric air-fuel ratio, and the controller adjusts, through the control of the fuel supply system, the amount of fuel to be supplied to the first cylinder group during the bank control and the amount of fuel to be supplied to the second cylinder group during the bank control such that the air-fuel ratio of exhaust gas downstream of the exhaust gas purification device equals the stoichiometric air-fuel ratio. With this arrangement, exhaust gas can be purified by the exhaust gas purification device even when the bank control is being executed.

Further, the internal combustion engine control apparatus according to the first aspect of the invention may further include an exhaust gas air-fuel ratio obtaining portion that obtains the air-fuel ratio of exhaust gas downstream of the exhaust gas purification device and the controller may include learning portion that corrects the amount of fuel to be supplied to the first cylinder group during the bank control and the amount of fuel to be supplied to the second cylinder group during the bank control based on the difference between the air-fuel ratio obtained by the exhaust gas air-fuel ratio obtaining portion and the stoichiometric air-fuel ratio. With this arrangement, even if the property or performance of the exhaust gas purification device changes due to aging, or the like, the air-fuel ratio of exhaust gas downstream of the exhaust gas purification device can be made equal to the stoichiometric air-fuel ratio during the bank control.

The exhaust gas purification device may be an adsorption-reduction type NOx catalyst unit. Because adsorption-reduction type NOx catalyst is poisoned by sulfur contents in exhaust gas, typically, a process for curing such SOx-poisoning of the adsorption-reduction type NOx catalyst is periodically executed. In the SOx-poisoning curing process, the temperature of the adsorption-reduction type NOx catalyst is increased to the target temperature for the SOx-poisoning curing process while the air-fuel ratio of exhaust gas around the adsorption-reduction type NOx catalyst is made equal to or lower (richer) than the stoichiometric air-fuel ratio. Thus, the invention can be effectively applied to an internal combustion engine having an adsorption-reduction type NOx catalyst unit.

The exhaust gas purification device may be filtering portion that traps particulate matter in exhaust gas, and the filtering portion may carry adsorption-reduction type NOx catalyst. In filtering portion, typically, a process for removing the particulate matter (PM) trapped in the filtering portion is periodically executed to recover the trapping capacity of the filtering portion. In this process, the filtering portion is heated up to a temperate that is high enough to oxidize and thus remove the trapped particulate matter. Thus, the invention can be effectively applied to an internal combustion engine having filtering portion.

In this specification, the word "adsorption-reduction type NOx catalyst" is intended to cover various NOx catalysts that can store NOx and therefore the word "adsorption" is not intended to specify that NOx should be stored in the NOx catalyst by being adsorbed in the NOx catalyst. That is, for example, NOx may be stored in the NOx catalyst by being absorbed in it. Further, the word "SOx-poisoning" is intended to cover various forms of SOx-poisoning as well as the one described above.

Further, the exhaust gas purification device may be a three-way catalyst unit. Because the purification capacity of three-way catalyst decreases due to adhesion of particulate matter, or the like, in exhaust gas, typically, the three-way catalyst unit is heated so as to recover the purification capacity. Thus, the invention can be effectively applied to an internal combustion engine having a three-catalyst unit.

The second aspect of the invention relates to an internal combustion engine control apparatus. This internal combustion engine control apparatus includes: a plurality of cylinders; an exhaust passage having branch portions provided for the respective cylinders and a common portion extending toward the downstream side from where the branch portions converge; a recoverable exhaust gas purification device provided in the common portion; a fuel supply system that supplies fuel to the respective cylinders; a controller that executes, through the control of the fuel supply system, an air-fuel ratio control mode in which the air-fuel ratio of one or more of the cylinders is made richer (lower) than a stoichiometric air-fuel ratio and the air-fuel ratio of the rest of the cylinders is made leaner (higher) than the stoichiometric air-fuel ratio so as to recover the exhaust gas purification device. The internal combustion engine is capable of running on fuel containing alcohol, and the internal combustion engine includes an alcohol concentration obtaining portion that obtains the concentration of alcohol in fuel supplied from the fuel supply system. The controller adjusts, through the control of the fuel supply system, the amount of unburned fuel to be supplied to the exhaust gas purification device during the air-fuel ratio control mode based on the alcohol concentration obtained by the alcohol concentration obtaining portion.

The third aspect of the invention relates to a method for controlling an internal combustion engine capable of running on fuel containing alcohol control apparatus including: a plurality of cylinder groups each consisting of at least one cylinder; an exhaust passage having branch portions provided for the respective cylinder groups and a common portion extending toward the downstream side from where the branch portions converge; a recoverable exhaust gas purification device provided in the common portion; and a fuel supply system that supplies fuel to the respective cylinder groups, wherein a bank control is executed in which, through the control of the fuel supply system, the air-fuel ratio of a first cylinder group among the cylinder groups is made richer than a stoichiometric air-fuel ratio and the air-fuel ratio of a second cylinder group among the cylinder groups is made leaner than the stoichiometric air-fuel ratio so as to recover the exhaust gas purification device. According to this method, the controller obtains the concentration of alcohol in fuel supplied from the fuel supply system and adjusts, through the control of the fuel supply system, the amount of unburned fuel to be supplied to the exhaust gas purification device during the bank control based on the obtained alcohol concentration.

According to the internal combustion engine control apparatus and method of the invention, as described above, because the amount of fuel to be supplied to the exhaust gas purification device during the bank control is adjusted in accordance with the alcohol concentration in fuel, the exhaust gas purification device can be properly heated up to the target temperate for recovering the purification capacity of the exhaust gas purification device, and therefore the exhaust gas purification device can be properly recovered regardless of the variation of the alcohol concentration in fuel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
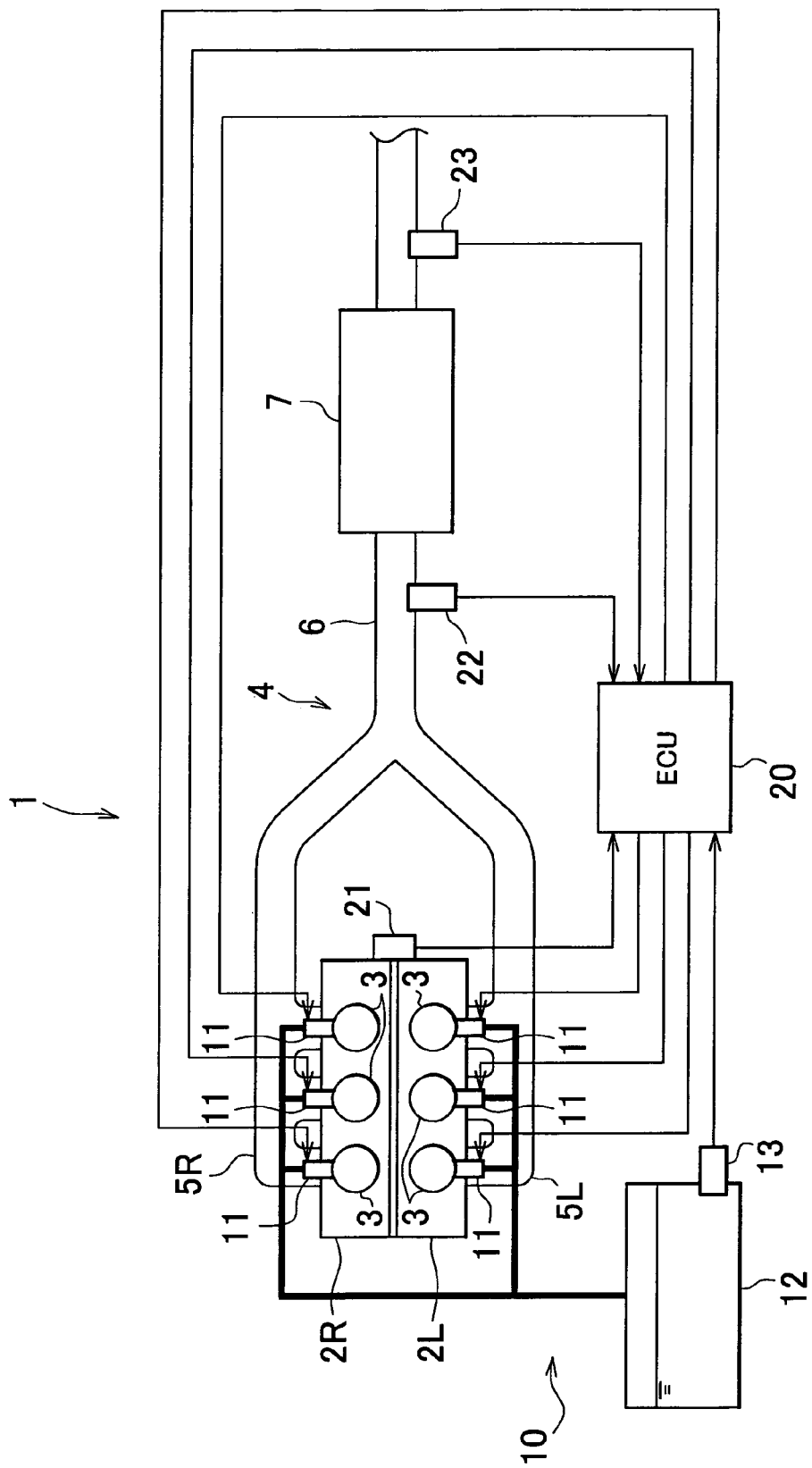
FIG. 1 is a view showing an internal combustion engine incorporating a control apparatus according to an example embodiment of the invention.

FIG. 1 shows an internal combustion engine 1 incorporating a control apparatus according to an example embodiment of the invention. The internal combustion engine 1 is mounted in a vehicle (e.g., motor vehicle) as a source of drive force for propelling the vehicle and is capable of running on fuel containing alcohol (e.g., ethanol). Referring to FIG. 1, the internal combustion engine 1 is a V6 engine (V-type six-cylinder engine) with a left bank 2L and a right bank 2R each having three cylinders 3. In the following, the internal combustion engine 1 will be simply referred to as "engine 1". In the engine 1, the three cylinders 3 of the left bank 2L together form one cylinder group, and the three cylinders 3 of the right bank 2R together form another cylinder group.

The engine 1 has an exhaust passage 4 connected to the exhaust ports of the respective cylinders 3. The exhaust passage 4 is comprised of two branch portions 5L, 5R provided for the left and right banks 2L, 2R, respectively, and a common portion 6. An exhaust gas purification catalyst unit 7 for purifying exhaust gas is provided in the common portion 6. The exhaust gas purification catalyst unit 7 may be regarded as one example of "exhaust gas purifying portion" of the invention. The exhaust gas purification catalyst unit 7 is, for example, an adsorption-reduction type NOx catalyst unit. Adsorption-reduction type NOx catalyst (will be simply referred to also as "NOx catalyst") adsorbs NOx in exhaust gas in a fuel-lean atmosphere having an air-fuel ratio higher than the stoichiometric air-fuel ratio, that is, in an oxygen-rich atmosphere (oxidizing atmosphere), and releases and reduces the adsorbed NOx in a fuel-rich atmosphere having an air-fuel ratio lower than the stoichiometric air-fuel ratio (reducing atmosphere) or in an atmosphere having an air-fuel ratio equal to the stoichiometric air-fuel ratio. Because such adsorption-reduction type NOx catalyst is known in the art, it is not described in detail in this specification. Thus, the exhaust gas purification catalyst unit 7 exerts its exhaust gas purification effect properly in a given air-fuel ratio range including the stoichiometric air-fuel ratio.

Further, the engine 1 has a fuel supply system 10. The fuel supply system 10 is constituted of injectors 11 provided at the respective cylinders 3 and a fuel tank 12. The injectors 11 are supplied with fuel pressurized by a fuel pump (not shown in the drawings). An alcohol concentration sensor 13 is provided in the fuel tank 12. The alcohol concentration sensor 13 outputs signals corresponding to the concentration of alcohol in fuel. Note that the alcohol concentration sensor 13 may be regarded as one example of "alcohol concentration obtaining portion" of the invention. The alcohol concentration sensor 13 is a known alcohol concentration sensor that detects the alcohol concentration in fuel based on, for example, the fact that the permittivity of hydrocarbon fuel (e.g., gasoline) and the permittivity of alcohol are different. Other than this, the alcohol concentration sensor 13 may instead be an alcohol concentration sensor that detects the alcohol concentration in fuel based on the conductivity in place of the permittivity or may be an alcohol concentration sensor that detects the alcohol concentration in fuel based on the fact that the specific gravity of fuel changes as the alcohol concentration in the fuel changes.

The operation of each injector 11 is controlled by an engine control unit (ECU) 20. The ECU 20 is a computer unit that is constituted of a microprocessor and peripheral components used for the operation of the microprocessor, such as RAM and ROM, and controls the operation of the engine 1 based on the outputs of various sensors provided in the engine 1. The ECU 20 calculates the amount of fuel to be injected from each injector 11 in accordance with, for example, the engine speed and the engine load and controls the operation of each injector 11 such that the calculated amount of fuel is actually injected into each cylinder 3. The sensors used in such fuel injection control are a crank angle sensor 21 that outputs signals corresponding to the angle of the crankshaft of the engine 1, an air-fuel ratio sensor 22 that outputs signals corresponding to the air-fuel ratio of exhaust gas upstream of the exhaust gas purification catalyst unit 7, an oxygen sensor 23 that outputs signals corresponding to the concentration of oxygen in exhaust gas downstream of the exhaust gas purification catalyst unit 7, etc., which are all connected to the ECU 20. The oxygen sensor 23 outputs approx. 1V in a fuel-rich atmosphere having an air-fuel ratio lower the stoichiometric air-fuel ratio and outputs approx. 0V in a fuel-lean atmosphere having an air-fuel ratio higher than the stoichiometric air-fuel ratio. Because such an oxygen sensor is known, no more detail is described in this specification. Having such an air-fuel ratio detecting capability, the oxygen sensor 23 may be regarded as one example of "exhaust gas air-fuel ratio obtaining portion" of the invention. Further, the alcohol concentration sensor 13 is connected to the ECU 20.

The NOx catalyst unit that is provided as the exhaust gas purification catalyst unit 7 is poisoned by sulfur oxides (SOx) contained in exhaust gas, and as the SOx poisoning progresses, the exhaust gas purification capacity of the NOx catalyst unit deteriorates. To cope with this, a so-called SOx-poisoning curing process is periodically executed to recover the exhaust gas purification capacity of the NOx catalyst unit. That is, the SOx-poisoning curing process cures the SOx-poisoning by heating the NOx catalyst unit up to a target temperature at which SOx components are released from the NOx catalyst unit while maintaining the air-fuel ratio of the exhaust gas around the NOx catalyst unit at the stoichiometric air-fuel ratio or richer than the stoichiometric air-fuel ratio. In this example embodiment, the heating of the NOx catalyst is accomplished by causing unburned fuel in exhaust gas to burn at the exhaust gas purification unit 7 such that the temperature of the exhaust gas purification unit 7 increases up to the target temperature range. During the SOx-poisoning curing process, the ECU 20 controls the operation of each injector 11 such that the air-fuel ratio of the cylinders 3 of the left bank 2L becomes richer than the stoichiometric air-fuel ratio while the air-fuel ratio of the cylinders 3 of the right bank 2R becomes leaner than the air-fuel ratio and such that the air-fuel ratio of exhaust gas downstream of the exhaust gas purification catalyst unit 7 equals the stoichiometric air-fuel ratio. This control will hereinafter be referred to as "bank control". Note that when the air-fuel ratios of the cylinders 3 are controlled as described above, the left bank 2L may be regarded as one example of "first cylinder group" of the invention and the right bank 2R may be regarded as one example of "second cylinder group" of the invention.

Figure 2:
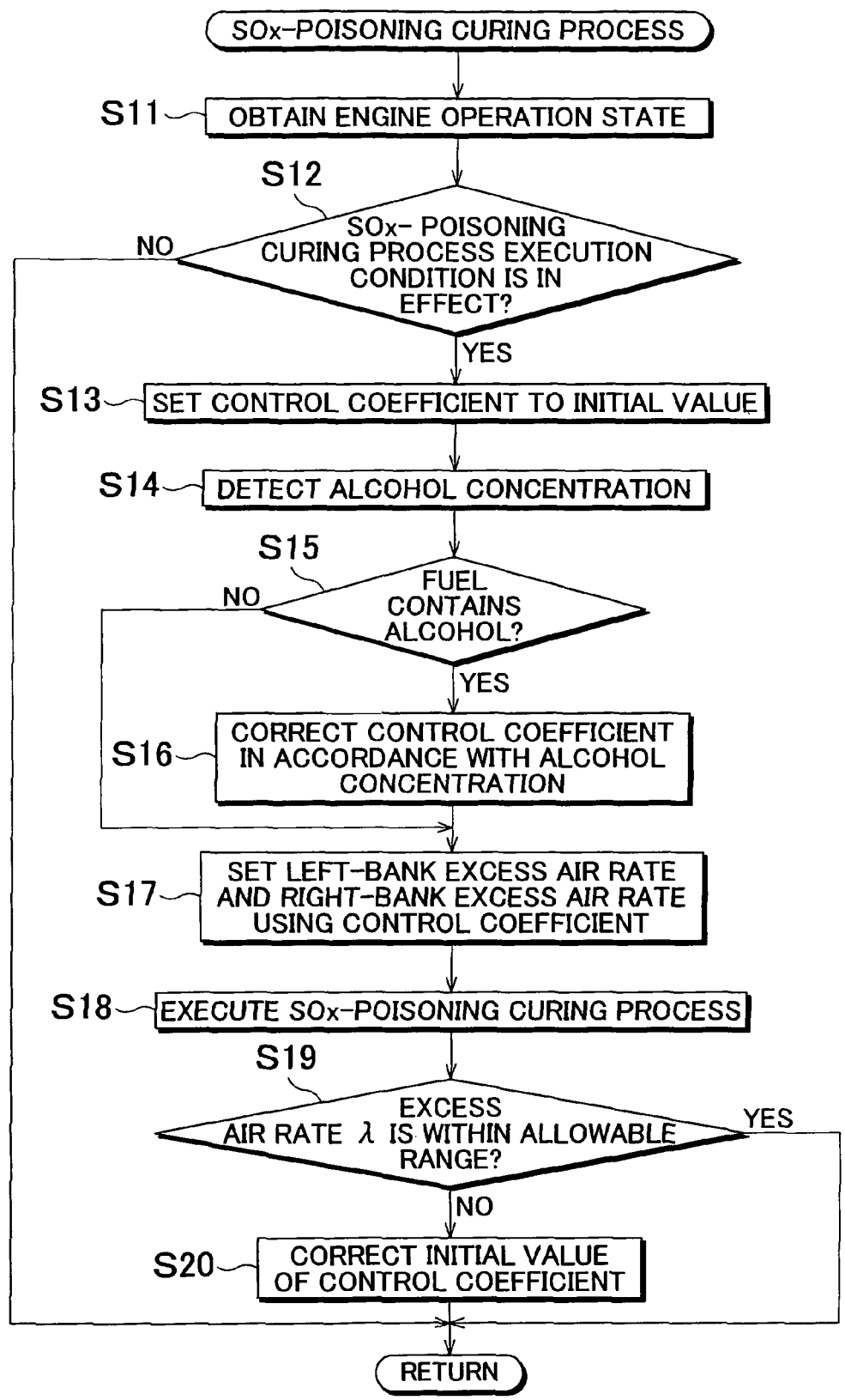
FIG. 2 is a flowchart illustrating a routine of the SOx-poisoning curing process that the ECU shown in FIG. 1 executes to cure the SOx poisoning of the NOx catalyst.

The calorific value of alcohol-containing fuel decreases as the alcohol concentration in the fuel increases. Therefore, the higher the alcohol concentration in fuel, the larger the amount of fuel needed to heat the exhaust gas purification catalyst unit 7 up to the target temperature range during the foregoing SOx-poisoning curing process. In view of this, in the invention, the operation of the injectors 11 for the cylinders 3 of the left bank 2L is controlled, during the bank control, such that the higher the alcohol concentration in the fuel, the larger the amount of unburned fuel to be supplied to the exhaust gas purification catalyst unit 7 becomes. This control will be described in more detail with reference to FIG. 2. FIG. 2 illustrates the routine of the SOx-poisoning curing process that the ECU 20 repeatedly executes at given time intervals to cure the SOx-poisoning of the exhaust gas purification catalyst unit 7 through the bank control during the operation of the engine 1. Note that, having the function of executing this routine, the ECU 20 may be regarded as one example of "controller" of the invention.

In the SOx-poisoning curing process illustrated in FIG. 2, the ECU 20 first obtains the operation state of the engine 1 in step 11. The operation state of the engine 1 is determined based on, for example, the output signals of the crank angle sensor 21 indicating the engine speed of the engine 1. Then, in step 12, the ECU 20 determines whether a SOx-poisoning curing process execution condition, the condition for executing the SOx-poisoning curing process for the exhaust gas purification catalyst unit 7, is presently in effect. Whether this condition is presently in effect may be determined using a known method. For example, the SOx-poisoning curing process execution condition may be regarded as being in effect when the total amount of fuel that has been consumed since the SOx-poisoning curing process was executed the last time is larger than a predetermined reference value. If it is determined in step 12 that the SOx-poisoning curing process execution condition is not presently in effect, the ECU 20 finishes the present cycle of the routine.

On the other hand, if it is determined in step 12 that the SOx-poisoning curing process execution condition is presently in effect, the ECU 20 then proceeds to step 13 and sets a control coefficient to its initial value. During the bank control, as mentioned above, the ECU 20 adjusts the amount of fuel to be supplied to each cylinder 3 such that the air-fuel ratio of the cylinders 3 of the left bank 2L becomes richer than the stoichiometric air-fuel ratio while the air-fuel ratio of the cylinders 3 of the right bank 2R becomes leaner than the stoichiometric air-fuel ratio and such that the air-fuel ratio of exhaust gas downstream of the exhaust gas purification catalyst unit 7 equals the stoichiometric air-fuel ratio. When executing the bank control, the ECU 20 sets the target value of the air-fuel ratio of the cylinders 3 of the left bank 2L (left-bank target air-fuel ratio) and the target value of the air-fuel ratio of the cylinders 3 of the right bank 2R (right-bank target air-fuel ratio) for the bank control and then adjusts the amount of fuel to be supplied to each injector 11 so as to achieve the set target air-fuel ratios for the cylinders 3 of the left bank 2L and the cylinders 3 of the right bank 2R. Note that the value obtained by dividing the left-bank target air-fuel ratio by the stoichiometric air-fuel ratio (left-bank excess air rate) and the value obtained by dividing the right-bank target air-fuel ratio by the stoichiometric air-fuel ratio (right-bank excess air rate) are used, when required, instead of the left-bank target air-fuel ratio and the right-bank target air-fuel ratio. The above-stated control coefficient is used to set the left-bank excess air rate and the right-bank excess air rate. More specifically, the right-bank excess air rate is set to the control coefficient, and the left-bank excess air rate is set to the reciprocal of the control coefficient. The initial value of the control coefficient is set equal to the value of the right-bank excess air rate that is set in the case where only gasoline is stored in the fuel tank 12, that is, in the case where the SOx-poisoning curing process for the exhaust gas purification catalyst unit 7 is executed using gasoline only. This initial valve of the control coefficient is empirically determined in advance and recorded in the RAM of the ECU 20. The initial value of the control coefficient is, for example, 1.2. Then, in step 14, the ECU 20 obtains the alcohol concentration in the fuel stored in the fuel tank 12 by referring to the output signals of the alcohol concentration sensor 13.

Figure 3:
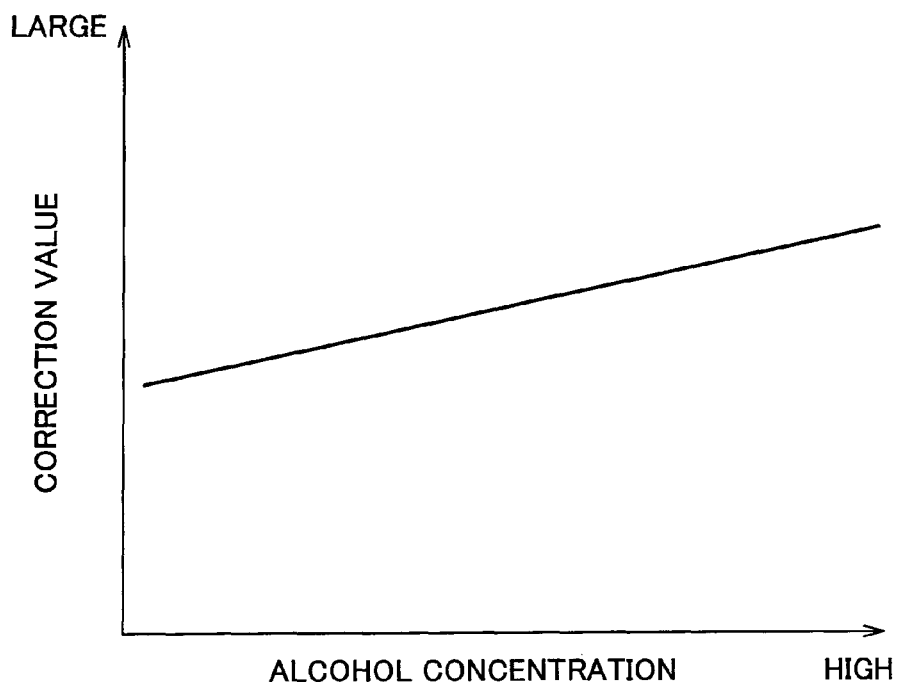
FIG. 3 is a chart illustrating an example relation between the alcohol concentration in fuel and a correction value.

Then, in step 15, the ECU 20 determines, based on the alcohol concentration obtained in step 14, whether alcohol is contained in the fuel. If it is determined that no alcohol is contained in the fuel, the ECU 20 then proceeds to step 17 by skipping step 16. On the other hand, if it is determined that alcohol is contained in the fuel, the ECU 20 then proceeds to step S16 and corrects the control coefficient based on the alcohol concentration in the fuel. As mentioned earlier, the higher the alcohol concentration in fuel, the larger the amount of unburned fuel needed to be supplied to the exhaust gas purification catalyst unit 7. As such, the control coefficient is corrected such that it increases as the alcohol concentration in fuel increases. Such correction of the control coefficient is accomplished by, for example, multiplying the correction coefficient set in step 13 by a correction valve calculated from a given map such as the one illustrated in FIG. 3. FIG. 3 illustrates the relation between the alcohol concentration in fuel and the correction value for correcting the control coefficient. This relation is empirically obtained in advance and recorded in the ROM of the ECU 20 in the form of a map.

Then, in step 17, the ECU 20 sets the left-bank excess air rate and the right-bank excess air rate using the control coefficient. As mentioned earlier, the left-bank excess air rate is set to the reciprocal of the control coefficient and the right-bank excess air rate is set to the control coefficient. Then, in step 18, the ECU 20 adjusts the amount of fuel to be injected from each injector 11 such that the air-fuel ratio of the cylinders 3 of the left bank 2L equals the left-bank target air-fuel ratio, that is, the left-bank excess-air ratio set as described above is achieved, and the air-fuel ratio of the cylinders 3 of the right bank 2R equals the right-bank target air-fuel ratio, that is, the right-bank excess-air ratio set as described above is achieved. That is, the bank control is executed to cure the SOx poisoning of the exhaust gas purification catalyst unit 7.

Figure 4:
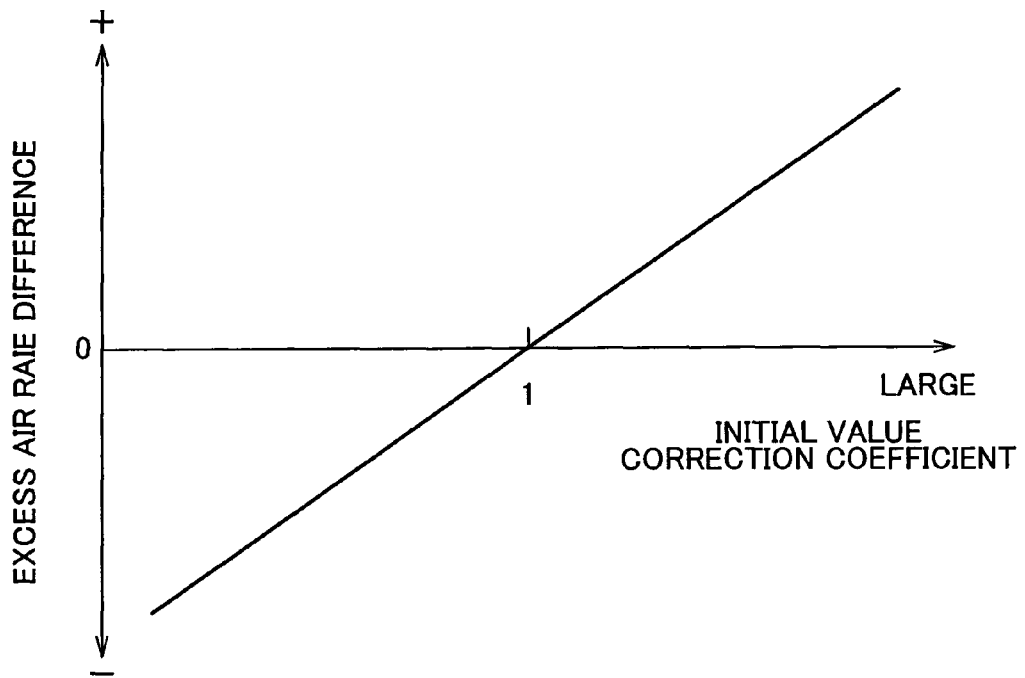
FIG. 4 is a chart illustrating an example relation between the excess air rate difference and the initial value correction coefficient.

Subsequently, in step 19, the ECU 20 determines, by referring to the output signals of the oxygen sensor 23, whether an excess air rate λ representing the excess air rate of exhaust gas downstream of the exhaust gas purification catalyst unit 7 is within a predetermined allowable range. The excess air rate λ is obtained by dividing the air-fuel ratio of exhaust gas downstream of the exhaust gas purification catalyst unit 7 by the stoichiometric air-fuel ratio. The allowable range ranges with respect to the stoichiometric air-fuel ratio, which is 1, as the center. The allowable range is set to, for example, 0.9 to 1.1. If it is determined that the excess air rate λ is within the allowable range, the ECU 20 finishes the present cycle of the routine. On the other hand, if it is determined that the excess air rate λ is out of the allowable range, the ECU 20 then proceeds to step 20. In step 20, the ECU 20 corrects the initial value of the control coefficient and records the corrected initial value in the RAM of the ECU 20 as the new initial value, after which the ECU 20 finishes the present cycle of the routine. When the excess air rate λ is out of the allowable range, it is considered that the air-fuel ratio of exhaust gas downstream of the exhaust gas purification catalyst unit 7 was largely deviating from the stoichiometric air-fuel ratio to the rich side or to the lean side during the bank control. That is, it is considered that the air-fuel ratio of the cylinders 3 of the left bank 2L was excessively, or insufficiently, changed to the rich side. Thus, if the air-fuel ratio of exhaust gas downstream of the exhaust gas purification catalyst unit 7 is richer than the stoichiometric air-fuel ratio during the bank control, the initial value of the control coefficient is reduced. As a result, the amount of fuel to be supplied to each cylinder 3 of the left bank 2L during the bank control is reduced, whereby the air-fuel ratio of exhaust gas downstream of the exhaust gas purification catalyst unit 7 during the bank control increases (becomes leaner), so that the excess air rate λ falls in the allowable range. On the other hand, if the air-fuel ratio of exhaust gas downstream of the exhaust gas purification catalyst unit 7 during the bank control is leaner than the stoichiometric air-fuel ratio, the initial value of the control coefficient is increased. In this case, the amount of fuel to be supplied to each cylinder 3 of the left bank 2L during the bank control increases, whereby the air-fuel ratio of exhaust gas downstream of the exhaust gas purification catalyst unit 7 decreases (become richer), so that the excess air rate λ falls in the allowable range. Such correction of the initial value of the control coefficient is accomplished as follows. First, an initial value correction coefficient is calculated, during the bank control, by applying the excess air rate representing the difference between the air-fuel ratio indicated by the output signals of the oxygen sensor 23 and the stoichiometric air-fuel ratio to a given map such as the one illustrated in FIG. 4. Then, the calculated initial value correction coefficient is multiplied by the present initial value of the control coefficient. The relation illustrated in FIG. 4 is empirically obtained and recorded in the ROM of the ECU 20. Having the function of executing this process, the ECU 20 may be regarded as one example of "learning portion" of the invention.

According to the routine illustrated in FIG. 2, the control coefficient is increased as the alcohol concentration in fuel increases so that the amount of fuel to be supplied to each cylinder 3 of the left bank 2L during the bank control increases and thus the amount of unburned fuel to be supplied to the exhaust gas purification catalyst unit 7 increases. Thus, even when the alcohol concentration in fuel is high, the exhaust gas purification catalyst unit 7 can be heated up to the target temperature for the SOx-poisoning curing process, and therefore the SOx-poisoning of the exhaust gas purification catalyst unit 7 can be cured properly.

Figure 5:
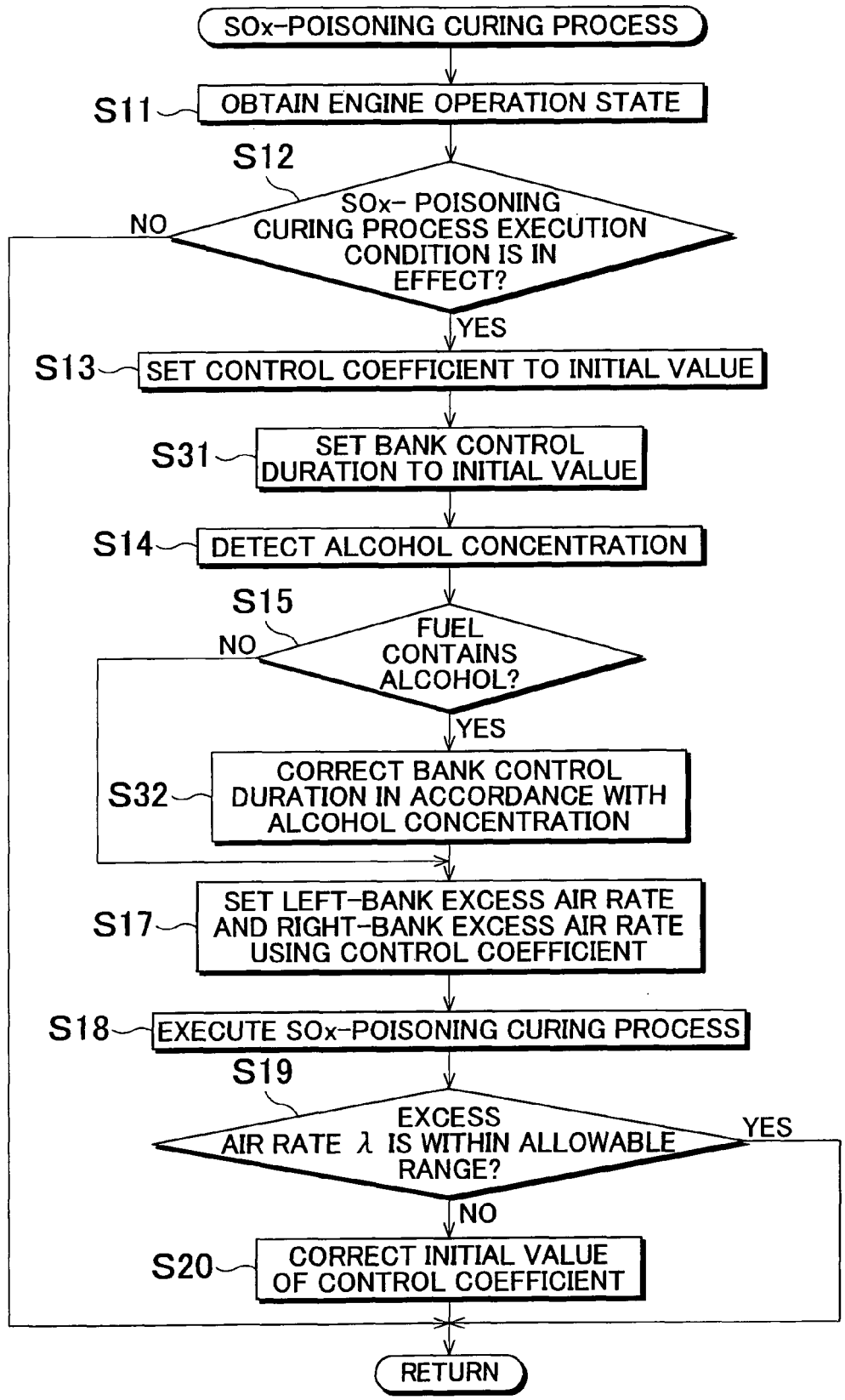
FIG. 5 is a flowchart illustrating another example routine of the SOx-poisoning curing process.

FIG. 5 illustrates another example routine of the SOx-poisoning curing process. In FIG. 5, the steps that are the same as those of the routine of FIG. 2 are denoted by the same numerals and they are not described here again. In the routine of FIG. 5, the ECU 20 executes step 11 and step 12 as it does in the routine of FIG. 2. If it is determined in step 12 that the SOx-poisoning curing process execution condition is presently in effect, the ECU 20 then proceeds to step 13 and sets the control coefficient to the initial value. Then, in step 31, the ECU 20 sets the duration of the bank control to its initial value corresponding to the time period for which the bank control needs to be executed in the case where the alcohol concentration in fuel is 0, that is, in the case where the SOx-poisoning curing process for the exhaust gas purification catalyst unit 7 is executed using gasoline only. The initial value of the duration of the bank control is obtained empirically, or through calculations, in advance and recorded in the RAM of the ECU 20.

Figure 6:
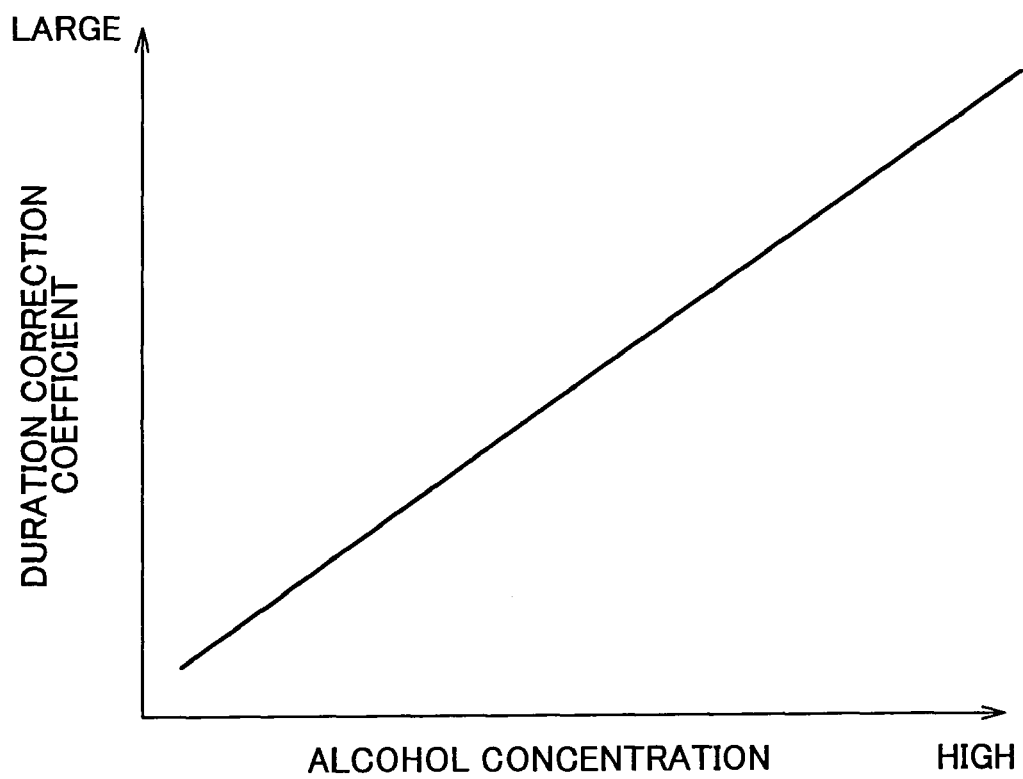
FIG. 6 is a chart illustrating an example relation between the alcohol concentration in fuel and the duration of the bank control.

Then, in step 14, the ECU 20 detects the alcohol concentration, and then in step 15, the ECU 20 determines whether alcohol is contained in the fuel stored in the fuel tank 12. If it is determined that no alcohol is contained in the fuel in the fuel tank 12, the ECU 20 proceeds to step 17 by skipping the step 32. On the other hand, if it is determined that alcohol is contained in the fuel in the fuel tank 12, the ECU 20 then proceeds to step 32 and corrects the duration of the bank control in accordance with the alcohol concentration. The higher the alcohol concentration, the larger the amount of fuel needed to be supplied to the exhaust gas purification catalyst unit 7. Therefore, the duration of the bank control is corrected such that the higher the alcohol concentration in the fuel, the longer the duration of the bank control becomes. Such correction of the duration of the bank control is accomplished by, for example, multiplying the initial value of the duration of the bank control by a duration correction coefficient that is obtained by referring to a given map such as the one illustrated in FIG. 6. Then, in step 17, the ECU 20 sets the left-bank excess air rate and the right-bank excess air rate using the control coefficient. Then, the ECU 20 executes the subsequent steps as it does in the routine of FIG. 2, after which the ECU 20 finishes the present cycle of the routine.

In the routine of FIG. 5, the higher the alcohol concentration in fuel, the longer the duration of the bank control is made, so that the amount of fuel to be supplied to the exhaust gas purification catalyst unit 7 increases. As s result, the exhaust gas purification catalyst unit 7 can be heated up to the target temperature for the SOx-poisoning curing process, and therefore the SOx poisoning of the exhaust gas purification catalyst unit 7 can be cured properly and the reduction of the purification capacity of the exhaust gas purification catalyst unit 7 due to the SOx poisoning is suppressed accordingly.

Meanwhile, the invention is not limited to the foregoing structures and arrangements, but it may be embodied in various forms. For example, internal combustion engines to which an internal combustion engine control apparatus of the invention can be applied are not limited to V-type engines.

That is, the invention may be applied to various other engines which can run on alcohol-containing fuel and have two or more cylinder groups and in which a process for recovering the capacity of an exhaust gas purification catalyst unit is implemented by making the air-fuel ratio of exhaust gas discharged from one cylinder group rich while making the air-fuel ratio of exhaust gas discharged from another cylinder group lean. Further, internal combustion engines to which the invention can be applied are not limited to so-called direct injection internal combustion engines in which fuel is directly injected into the cylinders. That is, the invention can be applied also to so-called port-injection internal combustion engines in which fuel is injected into the intake ports.

The exhaust gas purification device is not limited to adsorption-reduction type NOx catalyst units. For example, the invention may be applied to an internal combustion engine having, as an exhaust gas purification device, a particulate filter for trapping the particulate matter in exhaust gas. Further, the invention may be applied to an internal combustion engine having, as an exhaust gas purification device, a particulate filter carrying adsorption-reduction type NOx catalyst. In such internal combustion engines, a PM removing process is periodically executed, which recovers the exhaust gas purification capacity of the particulate filter by burning the trapped particulate matter by heating the particulate filter up to a temperature high enough to oxidize and thus remove the trapped particulate matter. In the case where the heating of the particulate filter during the PM removing process is accomplished by executing the bank control as in the case of the SOx-poisoning curing process of the foregoing example embodiment, the amount of fuel to be supplied to the particulate filter may be changed in accordance with the alcohol concentration in fuel. By thus adjusting the amount of fuel to be supplied to the particulate filter, the particulate filter can be heated up to the target temperature for the PM removing process even if the calorific value of fuel per unit amount changes due to the variation of the alcohol concentration in the fuel.

Further, the invention may be applied to an internal combustion engine having a three-way catalyst unit as an exhaust gas purification device. The exhaust gas purification capacity of three-way catalyst deteriorates if the particulate matter in exhaust gas adheres to the three way catalyst. Thus, in some cases, the three-way catalyst unit is periodically heated up to a temperature high enough to burn and thus remove the particulate matter adhering to the three-way catalyst. As such, if the invention is applied to an internal combustion engine having such a three-way catalyst unit, the three-way catalyst unit can be heated to the temperature for oxidizing and thus removing the adhering particulate matter regardless of the variation of the alcohol concentration in fuel.

In the foregoing example embodiment, as described above, the air-fuel ratio is controlled such that the air-fuel ratio of the cylinders of the left bank and the air-fuel ratio of the cylinders of the right bank differ from each other. Alternatively, the air fuel ratio may be controlled such that the air-fuel ratio of one or more of the cylinders in one bank of the internal combustion engine and the air-fuel ratio of the rest of the cylinders in the same bank differ from each other, or the air fuel ratio may be controlled, with no consideration on the banks, such that the air-fuel ratio of one or more of the cylinders of the internal combustion engine and the air-fuel ratio of the rest of the cylinders differ from each other. In either case, the same effects as those described above can be obtained.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. An internal combustion engine apparatus including an internal combustion engine comprising:
    a plurality of cylinder groups each consisting of at least one cylinder;
    an exhaust passage having branch portions provided for the respective cylinder groups and a common portion extending toward the downstream side from where the branch portions converge;
    a recoverable exhaust gas purification device provided in the common portion;
    a fuel supply system that supplies fuel to the respective cylinder groups;
    a controller that executes, through the control of the fuel supply system, a bank control in which an air-fuel ratio of a first cylinder group among the cylinder groups is made richer than a stoichiometric air-fuel ratio and an air-fuel ratio of a second cylinder group among the cylinder groups is made leaner than the stoichiometric air-fuel ratio so as to recover the exhaust gas purification device, wherein
    the internal combustion engine runs on fuel containing alcohol and includes an alcohol concentration obtaining portion that obtains the concentration of alcohol in fuel supplied from the fuel supply system,
    the controller adjusts, through the control of the fuel supply system, the amount of unburned fuel to be supplied to the exhaust gas purification device during the bank control based on the alcohol concentration obtained by the alcohol concentration obtaining portion, and
    the controller corrects an amount of fuel to be supplied to the first cylinder group during the bank control based on the alcohol concentration obtained by the alcohol concentration obtaining portion.

2. The internal combustion engine apparatus according to claim 1, wherein
    the higher the alcohol concentration obtained by the alcohol concentration obtaining portion, the larger the controller makes, through the control of the fuel supply system, the amount of unburned fuel to be supplied to the exhaust gas purification device during the bank control.

3. The internal combustion engine apparatus according to claim 1, wherein
    the higher the alcohol concentration obtained by the alcohol concentration obtaining portion, the larger the controller makes, through the control of the fuel supply system, the amount of fuel to be supplied to the first cylinder group during the bank control.

4. The internal combustion engine apparatus according to claim 1, wherein
    the controller changes the duration of the bank control based on the alcohol concentration obtained by the alcohol concentration obtaining portion.

5. The internal combustion engine apparatus according to claim 4, wherein
    the higher the alcohol concentration obtained by the alcohol concentration obtaining portion, the longer the controller makes the duration of the bank control.

6. The internal combustion engine apparatus according to claim 1, wherein
the exhaust gas purification device is adapted to exert its purification capability properly within a given air-fuel ratio range including the stoichiometric air-fuel ratio, and
the controller adjusts, through the control of the fuel supply system, the amount of fuel to be supplied to the first cylinder group during the bank control and the amount of fuel to be supplied to the second cylinder group during the bank control such that the air-fuel ratio of exhaust gas downstream of the exhaust gas purification device equals the stoichiometric air-fuel ratio.

7. The internal combustion engine apparatus according to claim 6, further comprising an exhaust gas air-fuel ratio obtaining portion that obtains the air-fuel ratio of exhaust gas downstream of the exhaust gas purification device, wherein
the controller includes learning portion that corrects the amount of fuel to be supplied to the first cylinder group during the bank control and the amount of fuel to be supplied to the second cylinder group during the bank control based on the difference between the air-fuel ratio obtained by the exhaust gas air-fuel ratio obtaining portion and the stoichiometric air-fuel ratio.

8. The internal combustion engine apparatus according to claim 1, wherein
the exhaust gas purification device is an adsorption-reduction type NOx catalyst unit.

9. The internal combustion engine apparatus according to claim 1, wherein
the exhaust gas purification device is filtering portion that traps particulate matter in exhaust gas.

10. The internal combustion engine apparatus according to claim 9, wherein
the filtering portion carries adsorption-reduction type NOx catalyst.

11. The internal combustion engine apparatus according to claim 1, wherein
the exhaust gas purification device is a three-way catalyst unit.

12. An internal combustion engine apparatus including an internal combustion engine comprising:
a plurality of cylinders;
an exhaust passage having branch portions provided for the respective cylinders and a common portion extending toward the downstream side from where the branch portions converge;
a recoverable exhaust gas purification device provided in the common portion;
a fuel supply system that supplies fuel to the respective cylinders;
a controller that executes, through the control of the fuel supply system, an air-fuel ratio control mode in which the air-fuel ratio of one or more of the cylinders is made richer than a stoichiometric air-fuel ratio and the air-fuel ratio of the rest of the cylinders is made leaner than the stoichiometric air-fuel ratio so as to recover the exhaust gas purification device, wherein
the internal combustion engine runs on fuel containing alcohol,
the internal combustion engine includes an alcohol concentration obtaining portion that obtains the concentration of alcohol in fuel supplied from the fuel supply system,
the controller adjusts, through the control of the fuel supply system, the amount of unburned fuel to be supplied to the exhaust gas purification device during the air-fuel ratio control mode based on the alcohol concentration obtained by the alcohol concentration obtaining portion, and
the controller corrects an amount of fuel to be supplied to the one or more of the cylinders during the air-fuel ratio control based on the alcohol concentration obtained by the alcohol concentration obtaining portion.

13. A method for controlling an internal combustion engine that runs on fuel containing alcohol and including: a plurality of cylinder groups each consisting of at least one cylinder; an exhaust passage having branch portions provided for the respective cylinder groups and a common portion extending toward the downstream side from where the branch portions converge; a recoverable exhaust gas purification device provided in the common portion; and a fuel supply system that supplies fuel to the respective cylinder groups, wherein a bank control is executed in which, through the control of the fuel supply system, the air-fuel ratio of a first cylinder group among the cylinder groups is made richer than a stoichiometric air-fuel ratio and the air-fuel ratio of a second cylinder group among the cylinder groups is made leaner than the stoichiometric air-fuel ratio so as to recover the exhaust gas purification device, the method comprising:
obtaining the concentration of alcohol in fuel supplied from the fuel supply system;
adjusting, through the control of the fuel supply system, the amount of unburned fuel to be supplied to the exhaust gas purification device during the bank control based on the obtained alcohol concentration; and
correcting an amount of fuel to be supplied to the first cylinder group during the bank control based on the obtained alcohol concentration.

* * * * *